UNITED STATES PATENT OFFICE.

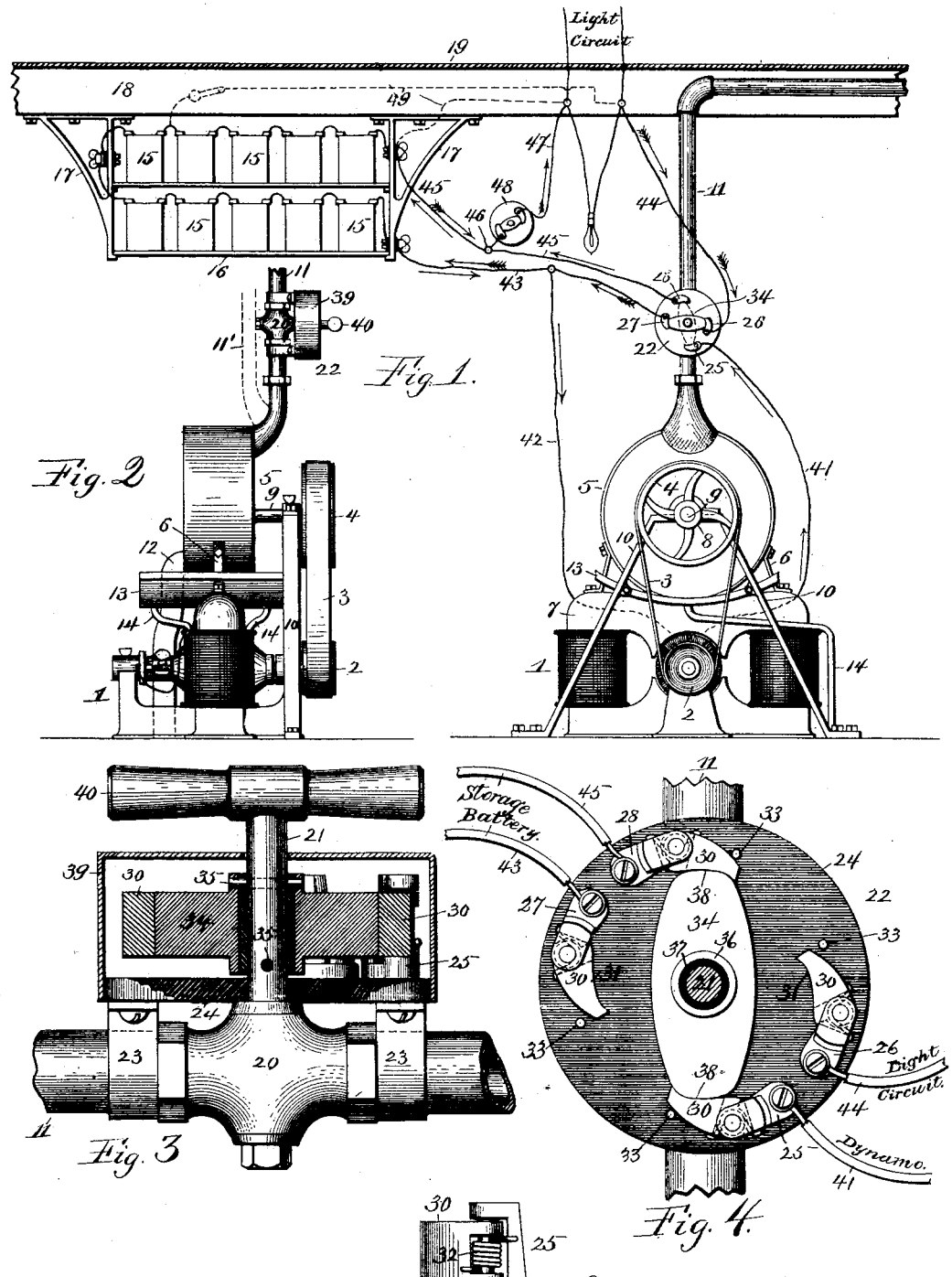

JAMES F. McLAUGHLIN, OF PHILADELPHIA, PENNSYLVANIA.

ISOLATED SYSTEM OF ELECTRIC LIGHTING.

SPECIFICATION forming part of Letters Patent No. 424,339, dated March 25, 1890.

Application filed December 7, 1889. Serial No. 332,885. (No model.)

*To all whom it may concern:*

Be it known that I, JAMES F. MCLAUGHLIN, a citizen of the United States, and a resident of Philadelphia, in the county of Philadelphia and State of Philadelphia, have invented certain new and useful Improvements in Isolated Systems of Electric Lighting, of which the following is a specification.

My invention has reference to isolated plants of electric lighting for private dwellings, hotels, farm-houses, and the like, in which a small water-power is available which may be utilized for running a suitable water-motor during the greater part of the day, and my invention involves the use of such water-motor for actuating a small dynamo-electric generator by which secondary batteries are charged and which are discharged into the lighting system whenever required.

The general equipment of the plant consists of a water-motor located at the lowest level of the house—as, for instance, in the cellar—and driven by water supplied by one or more distributing-pipes. This water-motor is geared to a dynamo-generator of any suitable construction, but preferably constructed to furnish a current of from one hundred and twenty to one hundred and fifty volts electromotive force and comparatively small volume, although I do not mean to confine myself to generators of this kind. Such dynamos require comparatively small power to be driven effectively, and in accordance with my invention the current generated by this dynamo is utilized to charge the plant of secondary batteries, which in turn are discharged into the light-circuit.

My invention also involves the use of a peculiar switch for connecting the dynamo-circuit with the secondary batteries for cutting the dynamo out of circuit and for connecting the secondary batteries with the light-circuit, and connected with said switch is a valve for the water-supply pipe or pipes, whereby when the dynamo is connected with the secondary batteries, the water is turned onto the hydraulic motor, and when the dynamo is cut out the water-supply is turned off. All this will more fully appear from the following detailed description, in which I have illustrated in—

Figure 1 an end elevation of the dynamo and water-motor with the combined switch and valve in position, showing also the secondary batteries and the circuit-connections. Fig. 2 is a side elevation of the water-motor and dynamo and of the combined switch and valve. Fig. 3 is a sectional view of the switch, with the water-supply service and valve shown in elevation. Fig. 4 is a top plan view of the switch, as shown in Fig. 3, with the switch-handle cut away; and Fig. 5 is a side view of one contact-brush of the switch with its supporting-bracket.

Like numerals of reference indicate like parts all throughout the drawings.

The general arrangement of the whole plant will be best understood by reference to Fig. 1. The dynamo-machine 1 is supposed to be located in a room on the lowest level of the house, and the armature-pulley 2 is connected by a belt 3 with a driving-pulley 4 of a water-motor 5, supported by legs or props 6 6 upon the field-magnet 7 of the dynamo. The journal-bearing 8 for the shaft 9 of the water-motor is shown in a frame-work 10, bolted to the floor of the room or cellar, and the feed-water for the motor is supplied by one or more pipes 11 11', while the waste water is carried off by the waste-pipe 12.

In order to protect the dynamo from the drippings from the water-motor, a dripping-pan 13 is interposed between the water-motor and the field-magnet 7, and this pan is tapped by dripping-pipes 14 14, which may be joined to the main waste-pipe 12, if so desired.

As has been stated, the water-motor is located at the lowest level of the house, and it is supposed that the house is supplied with a water-service, carrying water under considerable pressure, and the supply-pipe 11 is one of the pipes of the service, feeding the motor with a sufficient volume of water, at a sufficient pressure to drive the dynamo effectively, to generate a current of the required volume and tension to charge a plant of secondary batteries. These secondary batteries 15 are preferably, although not necessarily, mounted upon shelves 16 16, supported upon brackets 17 17, secured to one of the beams 18 of the ceiling 19 of the room or cellar.

In the drawings the cells of the battery are shown as coupled in series, and while this arrangement is quite suitable for the purpose in view, I am by no means limited to the same, and it will be understood that I may avail myself of the well-known practice of charging the secondary batteries while the same are coupled for quantity, and of discharging the same while coupled for tension.

The supply-pipe 11 is provided with an ordinary spigot-valve 20, (see Figs. 2 and 3,) and the valve-stem 21 is extended, as shown, to constitute at the same time the spindle of an electric switch 22, secured to the supply-pipe 11 by straps 23 23.

The construction of the switch 22 is clearly illustrated in Figs. 3, 4, and 5. There is a base 24, of insulating material, and I use for this purpose by preference some refractory substance, such as slate, glass, earthen-ware, &c. Four brackets 25 26 27 28, each provided with a binding-post 29, are secured upon the insulating-base, spaced in the manner shown in Fig. 4, and in each bracket is pivoted a brush-block 30, having a concave contact-face 31. The pintle of each brush-block has a helical spring 32, which, bearing with one end upon the brush-block and with the other upon the bracket, tends to throw the brush-block inwardly, as indicated in Fig 4, at the brackets 26 27, and the inward movement of the brush-block is limited by a shoulder on the block coming into contact with the bracket, as indicated in dotted lines in Fig. 4. The particular construction of these brush-blocks in connection with an electric switch, although novel with me, I do not claim herein, since the same is shown, described, and claimed in another pending application, Serial No. 330,154, filed November 13, 1889.

There are stop-pins 33, provided one for each brush-block, to limit the outward movement of the same. The stem 21 of the valve 20 is, as above stated, at the same time the spindle for the switch, and it carries the switch block or arm 34, which is secured to the same by pins 35 35 of insulating material, passing through the spindle, through a boss 36 on the switch-block, and through an insulating-bushing 37, inserted between the switch-block and the spindle, all of which is clearly shown in Figs 3 and 4.

The switch-block 34 is formed with two convex contact-faces 38 38—one at each end—and this switch-block is of such length that when turned so as to make contact with the brush-block 30 of the bracket 25 at one end the other end will make contact with the brush-block of the diametrically-opposite bracket 28. In its changed position the switch-block will make contact with the brush-blocks on brackets 26 and 27, as will be readily understood. The contact-faces of the switch-block are shaped to a curve described about the center of the spindle 21, and this flat curve merges at both ends into the sides of the switch-block by curves of smaller radius. The contact-faces of the brush-blocks are shaped to conform mainly to the flatter portion of the contact-faces of the switch-block, terminating, however, in a deeper curve, which conforms to the rounded corners or ends of the contact-faces of the switch-block. The consequence of this construction and of the stop-pins 33 is that when the switch-block is thrown into the position shown in Fig. 4, its ends will be wedged between the two brush-blocks of brackets 25 28, and cannot be turned farther in the direction of the arrow indicated in Fig. 4, but can be turned in the opposite direction to connect the brackets 26 and 27, between the brush-blocks of which it will now be wedged. By reason of this construction a very firm contact is established, and the possibility of turning the switch in the wrong direction is prevented.

A protective casing 39 may be and is preferably used, as shown in Fig. 3, and by simply turning the handle 40 the switch and the valve are operated together.

The circuit-connections are as follows: One terminal of the dynamo is connected by a conductor 41 with the brush-block of bracket 25, and the other terminal of the dynamo is connected by a conductor 42 with a conductor 43, which in turn connects one pole of the secondary battery with the brush-block of bracket 27. The brush-block of bracket 26 is connected by a conductor 44 with the light-circuit, while the brush-block of bracket 28 is connected by a conductor 45 with the other pole of the secondary battery. From this conductor 45 extends at a point 46 a conductor 47, which also connects with the light-circuit, and a simple switch 48, inserted into the conductor 47, serves the purpose of turning on and off the lights, as will presently be seen.

The operation of the system thus described will now be readily understood. If it is desired to charge the secondary battery, the switch is slowly turned to bring the switch-block 34 into the position shown in Fig. 4 and indicated in Fig. 1 in dotted lines, and by this action the valve 20 is opened in advance of the closing of the charging-circuit, it being understood that the switch-block is so fixed upon the valve-stem as to secure this result. The feed of water to the motor therefore begins before the charging-circuit is closed, and it at once actuates the dynamo, which thus acquires considerable speed before the circuit is closed, so that at the moment of closure of the circuit the electro-motive force of the dynamo is greater than that of the secondary battery, if the latter should happen to have a residual charge. The dynamo therefore generates a current the course of which may be traced by the unfeathered arrows marked on the drawings, viz: from one pole of the dynamo by conductor 41, brush-block of bracket 25, switch-block 34, conductor 45 to and through the secondary battery and returning from the same by conductors 43 and 42 to the other pole of the dynamo, charging the secondary battery, as is well understood. While the secondary battery is thus being charged the switch 48 is preferably opened, although this is not essential. The charging of the secondary battery may be continued during the whole time that no current is needed in the working or light circuit or even while some lights are being used, as will presently be explained.

When the time arrives for operating the whole lighting-plant, the switch 22 is operated to bring the switch-block 34 into the position shown in solid lines in Fig. 1, and by this action the secondary battery is connected with the lighting-plant, and the external circuit of the dynamo is opened at the brush-block of bracket 25, while at the same time the valve 20 is operated to cut off the water-supply for the hydraulic motor. If it is now desired to operate the lights, the switch 48 is closed and the secondary battery discharges. The discharging-circuit may now be traced by means of the feathered arrows marked on the drawings, as follows: From one pole of the secondary battery by conductor 45, and from point 46 of said conductor to switch 48 and conductor 47 to the lights, and returning by conductor 44, brush-blocks of brackets 26 and 27, and switch-block 34 by conductor 43 back to the other pole of the secondary battery.

The secondary battery may be tapped by one or more working-circuits for operating a limited number of lights during the time the charging process is going on. One of these sectional working-circuits is indicated in dotted lines at 49 49.

In addition to the feeding-pipe 11 I have shown an additional feeding-pipe 11' in dotted lines in Fig. 2, which, if so desired, may be controlled by a separately-actuated valve.

Having now fully described my invention, I claim and desire to secure by Letters Patent—

1. A system of electric lighting consisting, essentially, of a hydraulic motor, a dynamo-electric generator driven by the same, a secondary battery adapted to be charged by the dynamo and to discharge into the light-circuits, and a combined switch and valve for simultaneously controlling the circuits and the feed-water for the motor, substantially as described.

2. In a system of electric lighting, the combination of a dynamo-electric generator, a hydraulic motor for driving the same, and a secondary battery adapted to be charged by the dynamo, with a two-way switch establishing in one position the charging-circuit and in the other position breaking said circuit and establishing the discharging-circuit, and a valve controlling the water-supply for the motor coupled with the switch for turning on the water when the charging-circuit is closed and for turning the water off when the charging-circuit is opened, substantially as described.

In testimony whereof I have signed my name to this specification in the presence of two subscribing witnesses.

JAMES F. McLAUGHLIN.

Witnesses:
EDWIN F. GLENN,
H. P. KER.